(12) United States Patent
Fujii et al.

(10) Patent No.: US 10,720,861 B2
(45) Date of Patent: Jul. 21, 2020

(54) MOTOR CONTROL DEVICE AND MOTOR CONTROL METHOD

(71) Applicant: FANUC CORPORATION, Yamanashi (JP)

(72) Inventors: Shouta Fujii, Yamanashi-ken (JP); Sou Saito, Yamanashi-ken (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/351,705

(22) Filed: Mar. 13, 2019

(65) Prior Publication Data

US 2019/0288615 A1  Sep. 19, 2019

(30) Foreign Application Priority Data

Mar. 15, 2018 (JP) ................................. 2018-047528

(51) Int. Cl.
  *B25J 9/16* (2006.01)
  *H02P 27/06* (2006.01)
  *H02P 3/22* (2006.01)

(52) U.S. Cl.
  CPC ..................................... *H02P 3/22* (2013.01)

(58) Field of Classification Search
  CPC ................ H02P 3/22; H02P 27/06; B25J 9/16
  See application file for complete search history.

(56) References Cited

U.S. PATENT DOCUMENTS

| 2013/0221888 | A1* | 8/2013 | Horikoshi | H02P 27/06 318/400.29 |
|---|---|---|---|---|
| 2015/0290806 | A1* | 10/2015 | Garde | B25J 9/1651 700/245 |
| 2015/0326151 | A1 | 11/2015 | Ogawa | |
| 2016/0226407 | A1* | 8/2016 | Saitou | H02P 3/22 |
| 2017/0054394 | A1* | 2/2017 | Jung | H02P 3/22 |

FOREIGN PATENT DOCUMENTS

| JP | H02280682 A | 11/1990 |
|---|---|---|
| JP | 5318359 A | 12/1993 |
| JP | H08265901 A | 10/1996 |
| JP | 2009142115 A | 6/2005 |

(Continued)

OTHER PUBLICATIONS

English Abstract and Machine Translation for Japanese Publication No. 2014-110704 A, published Jun. 12, 2014, 8 pgs.

(Continued)

*Primary Examiner* — Cortez M Cook
(74) *Attorney, Agent, or Firm* — Fredrikson & Byron, P.A.

(57) ABSTRACT

A motor control device for controlling a servomotor, includes an inverter having multiple switching elements, a motor control unit configured to control switching operation of the multiple switching elements to thereby drive the servomotor, a brake configured to apply a braking force to the servomotor, a brake control unit configured to control the brake and a state acquisition unit configured to acquire a rotational state of the servomotor. The brake control unit actuates the brake when the rotation amount per unit time of the servomotor reaches a predetermined amount or greater in a state where the servomotor is not driven by the motor control unit and the brake is not operated.

6 Claims, 5 Drawing Sheets

(56) References Cited

FOREIGN PATENT DOCUMENTS

| JP | 2014057391 A | 3/2014 |
|---|---|---|
| JP | 2014110704 A | 6/2014 |
| JP | 2016144232 A | 8/2016 |
| JP | 2018014802 A | 1/2018 |
| WO | 2005035205 A1 | 4/2005 |
| WO | 2014091602 A1 | 6/2014 |
| WO | 201420779 A1 | 12/2014 |

OTHER PUBLICATIONS

English Abstract and Machine Translation for Japanese Publication No. 2009-142115 A, published Jun. 25, 2009, 13 pgs.
English Abstract and Machine Translation for Japanese Publication No. 05-318359 A, published Dec. 3, 1993, 8 pgs.
English Machine Translation for Japanese Publication No. JPH02-280682A, published Nov. 16, 1990, 5 pgs.
English Machine Translation for Japanese Publication No. JPH08-265901A, published Oct. 11, 1996, 21 pgs.
English Abstract of International Publication No. WO2005/035205A1, published Apr. 21, 2005, 1 pg. (including English Machine Translation of Japanese Publication No. JPWO2005035205A1, published Dec. 21, 2006, 7 pgs.).
English Machine Translation for Japanese Publication No. JP2014-057391A, published Mar. 27, 2014, 11 pgs.
English Machine Translation for International Publication No. WO2014/207779A1, published Dec. 31, 2014, 23 pgs.
English Machine Translation for Japanese Publication No. JP2016-144232A, published Aug. 8, 2016, 8 pgs.
English Machine Translation for Japanese Publication No. JP2018-014802A, published Jan. 25, 2018, 13 pgs.

\* cited by examiner

MOTOR CONTROL DEVICE AND MOTOR CONTROL METHOD

CROSS-REFERENCE TO RELATED APPLICATION

This application is based upon and claims the benefit of priority from Japanese Patent Application No. 2018-047528 filed on Mar. 15, 2018, the contents of which are incorporated herein by reference.

BACKGROUND OF THE INVENTION

Field of the Invention

The present invention relates to a motor control device and a motor control method for controlling a servomotor and controlling a brake that applies a braking force to a servomotor.

Description of the Related Art

Japanese Laid-Open Patent Publication No. 05-318359 discloses a system of turning off a dynamic brake circuit for applying a braking force to a motor that drives an arm (a movement target) of a robot when teaching the robot directly.

SUMMARY OF THE INVENTION

However, when the brake is released as disclosed in Japanese Laid-Open Patent Publication No. 05-318359, there occur cases where the movement target (the arm of the robot or the like) drops or lowers under its own weight and then collides with an object (surroundings) located therebelow, or the movement target is pushed too strongly by the operator, so that the arm does not stop due to inertia, and then collides against the objects in the surroundings.

It is therefore an object of the present invention to provide a motor control device and a motor control method which prevent a movement target from colliding with objects in the surroundings even when the movement target is manually moved with the brake released.

A first aspect of the present invention resides in a motor control device for controlling a servomotor, which includes: an inverter having a plurality of switching elements and configured to convert a DC voltage into an AC voltage and supply the AC voltage to the servomotor; a motor control unit configured to control switching operation of the plurality of switching elements to thereby drive the servomotor; a brake configured to apply a braking force to the servomotor; a brake control unit configured to control the brake; and a state acquisition unit configured to acquire a rotational state of the servomotor. The brake control unit is configured to actuate the brake when a rotation amount per unit time of the servomotor reaches a predetermined amount or greater in a state where the servomotor is not driven by the motor control unit and the brake is not operated.

A second aspect of the present invention resides in a motor control method of a motor control device for controlling a servomotor. The motor control device includes: an inverter having a plurality of switching elements and configured to convert a DC voltage into an AC voltage and supply the AC voltage to the servomotor; and a brake configured to apply a braking force to the servomotor. The motor control method includes: a motor control step of controlling switching operation of the plurality of switching elements to thereby drive the servomotor; a brake control step of controlling the brake; and a state acquiring step of acquiring a rotational state of the servomotor, in the brake control step, the brake is actuated when a rotation amount per unit time of the servomotor reaches a predetermined amount or greater in a state where the servomotor is not driven by the motor control step and the brake is not operated.

According to the present invention, even when the brake is released and the movement target is moved by hand, it is possible to prevent the movement target from colliding with the surroundings.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

The motor control device and the motor control method according to the present invention will be detailed hereinbelow by describing preferred embodiments with reference to the accompanying drawings.

First Embodiment

Figure 1:
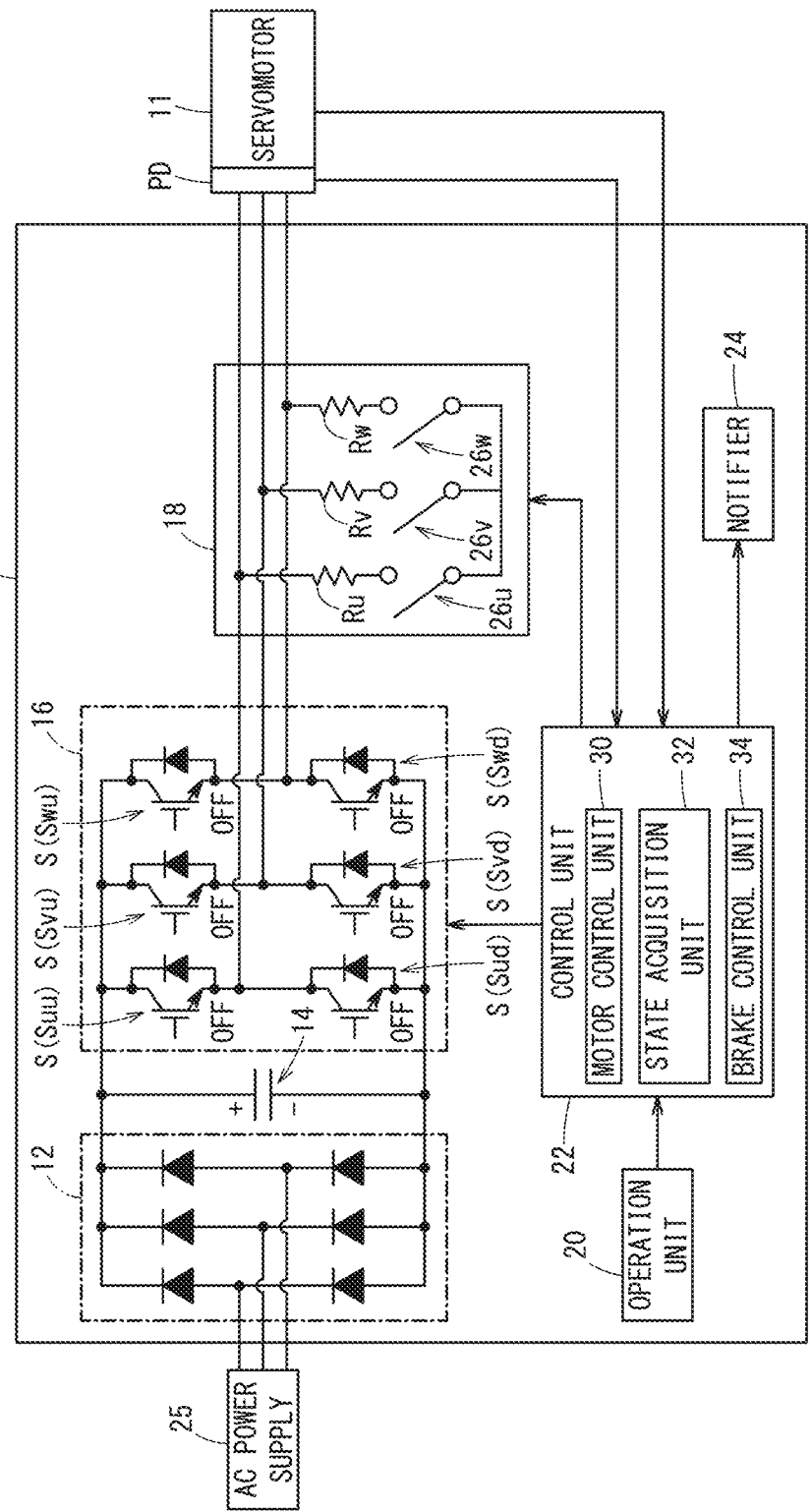
FIG. 1 is a diagram showing an example of a configuration of a motor control device according to a first embodiment.

FIG. 1 is a diagram showing an example of a configuration of a motor control device 10 according to a first embodiment. The motor control device 10 is a control device that controls a servomotor 11. The motor control device 10 includes a rectifier 12, a smoothing capacitor 14, an inverter 16, a brake 18, an operation unit 20, a control unit 22 and a notifier 24. In the present embodiment, the servomotor 11 has three-phase (UVW) motor coils (not shown), and the servomotor 11 is provided with a position detector PD for detecting a rotational position. The servomotor 11 drives, for example, an articulated arm of a robot.

The rectifier 12 rectifies an AC (alternating-current) voltage supplied from an AC power supply 25 into a DC (direct-current) voltage. The smoothing capacitor 14 smooths the DC voltage rectified by the rectifier 12. In the present embodiment, the AC power supply 25 supplies three-phase (UVW) AC voltage to the rectifier 12.

The inverter 16 converts the DC voltage rectified by the rectifier 12 (specifically, the voltage across the smoothing capacitor 14) into an AC voltage to thereby drive the servomotor 11. The inverter 16 includes a plurality of switching elements (semiconductor switching elements) S. The multiple switching elements S include an upper arm switching element Suu and a lower arm switching element Sud for U phase, an upper arm switching element Svu and a lower arm switching element Svd for V phase, and an upper switching element Swu and a lower arm switching element Swd for W phase.

The three-phase upper arm switching elements Suu, Svu, and Swu connect the positive terminal of the smoothing capacitor 14 with respective three-phase motor coils of the servomotor 11. The three-phase lower arm switching elements Sud, Svd, Swd connect the negative terminal of the smoothing capacitor 14 with respective three-phase motor coils of the servomotor 11. For each phase, the upper arm switching element S and the lower arm switching elements S are connected in series, and the series-connected upper and lower arm switching elements S are connected in parallel with the smoothing capacitor 14.

The inverter 16 performs switching operations (on/off operations) of the three-phase upper arm switching elements Suu, Svu, Swu and the three-phase lower arm switching elements Sud, Svd, Swd to thereby covert the voltage across the smoothing capacitor 14 (hereinafter referred to as "capacitor voltage") into an AC voltage and drive the servomotor 11.

The brake 18 applies a braking force to the servomotor 11. In the present description, it is assumed that a dynamic brake is used as the brake 18 and will be referred to as the dynamic brake 18 in the following description. The dynamic brake 18 includes resistors Ru, Rv, Rw and switches 26u, 26v, 26w for short-circuiting the three-phase motor coils of the servomotor 11 via the resistors Ru, Rv, Rw. As the switches 26u, 26v, 26w are turned on, the three-phase motor coils of the servomotor 11 are short-circuited via the resistors Ru, Rv, Rw. As a result, electric power generated in the servomotor 11 can be quickly consumed, and the servomotor 11 can be braked. In FIG. 1, the switches 26u, 26v, and 26w are turned off.

The operation unit 20 receives an operation given by an operator and outputs an operation signal corresponding to the operator's operation to the control unit 22.

The control unit 22 is a computer having a processor such as a CPU and a storage medium and the like. The control unit 22 includes a motor control unit 30, a state acquisition unit 32 and a brake control unit 34.

The motor control unit 30 controls the switching operation of the multiple switching elements S of the inverter 16 to thereby drive the servomotor 11. When all the switching elements S are turned off, driving of the servomotor 11 is stopped.

The state acquisition unit 32 acquires the rotational state of the servomotor 11. Specifically, the state acquisition unit 32 acquires the rotational position detected by the position detector PD. From change in the rotational position, it is possible to acquire the rotational state of the servomotor 11.

The brake control unit 34 performs ON-OFF control of the switches 26u, 26v, 26w of the dynamic brake 18 to thereby apply and release the braking force with respect to the servomotor 11. The brake control unit 34 performs ON-OFF control of the switches 26u, 26v, 26w by outputting control signals to the dynamic brake 18.

In principle, the brake control unit 34 activates the dynamic brake 18 by turning on the switches 26u, 26v, 26w when the motor control unit 30 is not driving the servomotor 11. Thus, a braking force is applied to the servomotor 11. When the motor control unit 30 is driving the servomotor 11, the brake control unit 34 turns off the switches 26u, 26v and 26w so as to deactivate the dynamic brake 18 (stop the operation). As a result, the application of the braking force to the servomotor 11 is released.

In a case that an operator operates the operation unit 20 to thereby give an instruction to release the brake when the motor control unit 30 is not driving the servomotor 11, the brake control unit 34 turns off the switches 26u, 26v and 26w. For example, when the operator performs so-called teaching, i.e., manually teaches the postures and positions to the articulated arm robot, if a braking force is applied to the servomotor 11, it is difficult to rotate the servomotor 11 with a weak external force (to move a movement target with a weak external force) and the operator faces difficulties in teaching. In such a case, the operator gives a brake-release instruction by operating the operation unit 20.

However, there is a risk that, when braking of the servomotor 11 is released, the movement target (for example, an articulated arm or the like) to be moved by the servomotor 11 falls or drops freely due to gravity and collides with an object located therebelow (in the surroundings). There is also another risk that, when the operator pushes the movement target (for example, an articulated arm or the like) too strongly, the movement target cannot stop immediately due to inertial force and collides with an object located therearound (in the surroundings).

To address the above situation, in the present embodiment, when the rotation amount per unit time of the servomotor 11 reaches a predetermined value or greater in a state where the servomotor 11 is not driven by the motor control unit 30 and the dynamic brake 18 is not operated, the brake control unit 34 turns on the switches 26u, 26v and 26w to thereby activate the dynamic brake 18. Specifically, the brake control unit 34 actuates the dynamic brake 18 when it is determined, based on the rotational position of the servomotor 11 obtained by the state acquisition unit 32, that the amount of change in the rotational position per unit time reaches a predetermined amount or greater. Further, when the rotation amount per unit time of the servomotor 11 reaches the predetermined value or greater, the brake control unit 34 outputs an operation signal indicating that the brake has been activated, to the notifier 24.

Thereby, even when the dynamic brake 18 is released and the movement target is manually moved, it is possible to prevent the movement target from colliding with the surroundings. For example, even if application of the braking force to the servomotor 11 is released at the time of teaching, it is possible to prevent the articulated arm from colliding with the surroundings.

Here, the rotation amount per unit time becomes a predetermined amount or more when the movement target (e.g., an articulated arm or the like) falls freely due to gravity and when the operator strongly pushes the movement target (e.g., an articulated arm or the like).

When receiving the operation signal sent from the brake control unit 34, the notifier 24 informs the operator that the brake has been activated. The notifier 24 may have a display unit such as a liquid crystal display, and may notify the operator by displaying on the display unit information that the brake has been activated. In addition, the notifier 24 may include at least one of a speaker that outputs sound and a light emitter that emits light, and use at least one of sound and light to notify the operator that the brake has been activated. Alternatively, the notifier 24 may send the operation signal to an external device having at least one of a display unit, a speaker and a light emitter, and cause the external device to notify the fact that the brake has been actuated. Thus, the operator can recognize that the dynamic brake 18 has been activated to apply the braking force to the servomotor 11.

Figure 2:
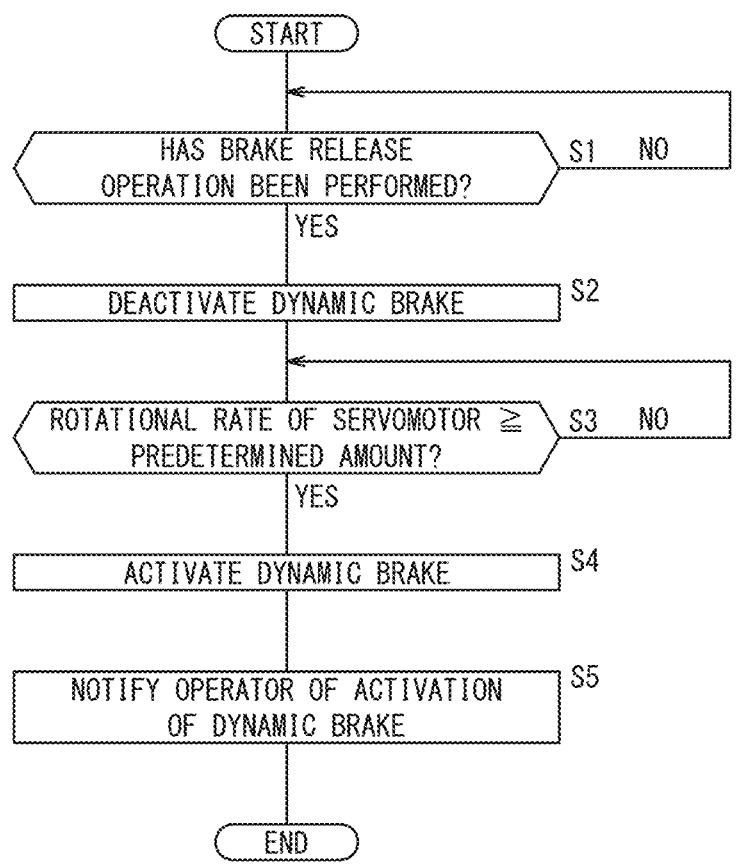
FIG. 2 is a flowchart showing the operation of the motor control device shown in FIG. 1.

Next, the operation of the motor control device 10 will be described with reference to the flowchart shown in FIG. 2. FIG. 2 illustrates an operation on the premise that the motor control unit 30 does not drive the servomotor 11 and the brake control unit 34 is operating the dynamic brake 18.

It is also assumed that the state acquisition unit 32 periodically acquires the rotational position detected by the position detector PD.

At step S1, the brake control unit 34 determines whether or not a brake release operation has been performed by the operator. This determination is made based on the operation signal sent from the operation unit 20.

If it is determined at step S1 that the brake release operation has not been performed, the control waits in step S1 until it is determined that the brake release operation has been performed. If it is determined that the brake release operation has been performed, the operation proceeds to step S2.

At step S2, the brake control unit 34 turns off the switches 26$u$, 26$v$ and 26$w$ to thereby deactivate the dynamic brake 18. As a result, braking of the servomotor 11 is released.

Next, at step S3 the brake control unit 34 determines whether the rotation amount per unit time of the servomotor 11 has reached a predetermined amount or more. In other words, it is determined whether or not the amount of change in the rotational position (rotation amount) per unit time of the servomotor 11 has reached a predetermined amount or more.

If it is determined at step S3 that the rotation amount per unit time is less than the predetermined amount, the control waits in step S3 until it is determined that the rotation amount per unit time is equal to or greater than the predetermined amount. If it is determined that the rotation amount per unit time is equal to or greater than the predetermined amount, the control proceeds to step S4.

At step S4, the brake control unit 34 turns on the switches 26$u$, 26$v$ and 26$w$ to thereby activate the dynamic brake 18.

Next, at step S5, the notifier 24 informs the operator that the dynamic brake 18 has been activated.

Second Embodiment

Figure 3:
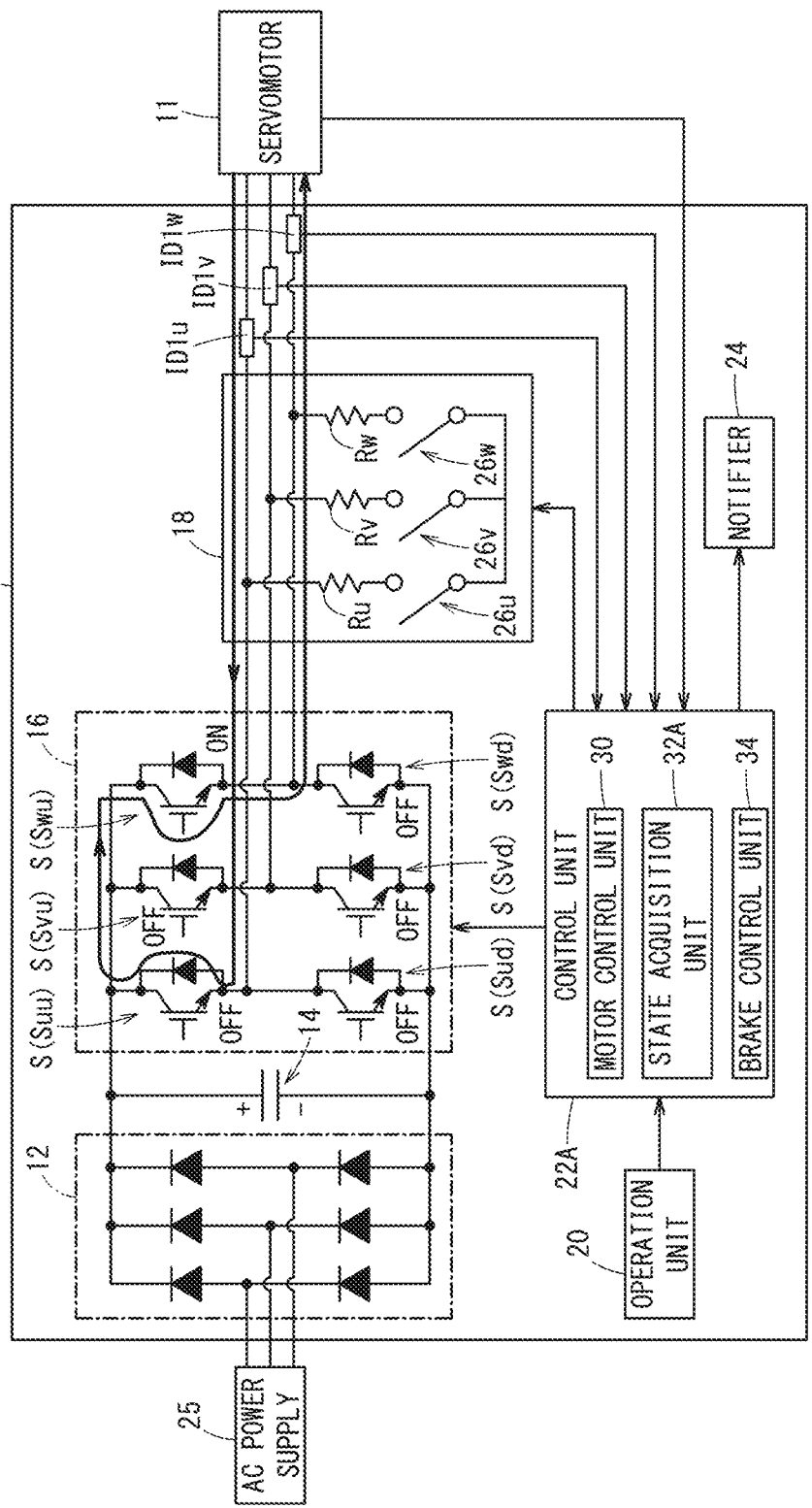
FIG. 3 is a diagram showing an example of a configuration of a motor control device according to a second embodiment.

FIG. 3 is a diagram showing an example of a configuration of a motor control device 10A according to a second embodiment. The motor control device 10A shown in FIG. 3 has the same configuration as the motor control device 10 shown in FIG. 1, except that an arrangement for detecting the rotational state of the servomotor 11 based on the electric current generated by the servomotor 11 is added. Incidentally, the same components as those of the first embodiment are denoted by the same reference numerals, and only the difference will be explained. In the second embodiment, the servomotor 11 does not necessarily need to be provided with the position detector PD.

The motor control device 10A includes a rectifier 12, a smoothing capacitor 14, an inverter 16, a dynamic brake (brake) 18, an operation unit 20, a control unit 22A, a notifier 24, current detectors ID1$u$, ID1$y$ and ID1$w$. The current detectors ID1$u$, ID1$y$ and ID1$w$ are sensors that detect currents flowing through the three-phase motor coils.

The control unit 22A includes a motor control unit 30, a state acquisition unit 32A, and a brake control unit 34.

When the servomotor 11 is rotated in a state where the servomotor 11 is not being driven and the dynamic brake 18 is in a non-operating state, the servomotor 11 generates electric power. In this state, when the motor control unit 30 turns on at least one of multiple switching elements S, a circuit (current path) for returning the electric current generated by the servomotor 11 to the servomotor 11 via the inverter 16 can be formed. At this time, if the switching element S remains in an ON state, the inverter 16 itself functions as the dynamic brake 18 and applies a braking force to the servomotor 11. As such, the switching element S is turned ON intermittently. As a result, the current path is also formed intermittently. The duration time during which the switching element S is in an ON state, in the intermittent cycle, is set so that the braking force applied to the servomotor 11 will be equal to or less than a predetermined level (for example, it is turned ON for a brief moment in one intermittent cycle).

Formation of such electric current path makes it possible for at least two of the current detectors ID1$u$, ID1$y$ and ID1$w$ to detect the electric current generated by the servomotor 11. This generated current increases in proportion to the rotation amount per unit time of the servomotor 11. Accordingly, observation of the generated current makes it possible to acquire the rotational state of the servomotor 11. Therefore, in the second embodiment, the state acquisition unit 32A acquires the generated currents detected by the current detectors ID1$u$, ID1$y$, ID1$w$ as the rotational state of the servomotor 11.

For example, as shown in FIG. 3, the motor control unit 30 can form a current path by turning on the upper arm W-phase switching element Swu, and can detect the generated current flowing through this current path by the current detectors ID1$u$ and ID1$w$.

In the second embodiment, when the generated currents detected by the current detectors ID1$u$, ID1$y$, ID1$w$ become equal to or greater than a threshold (first threshold) TH1, the brake control unit 34 determines that the rotation amount per unit time of the servomotor 11 has reached the predetermined amount or greater.

Figure 4:
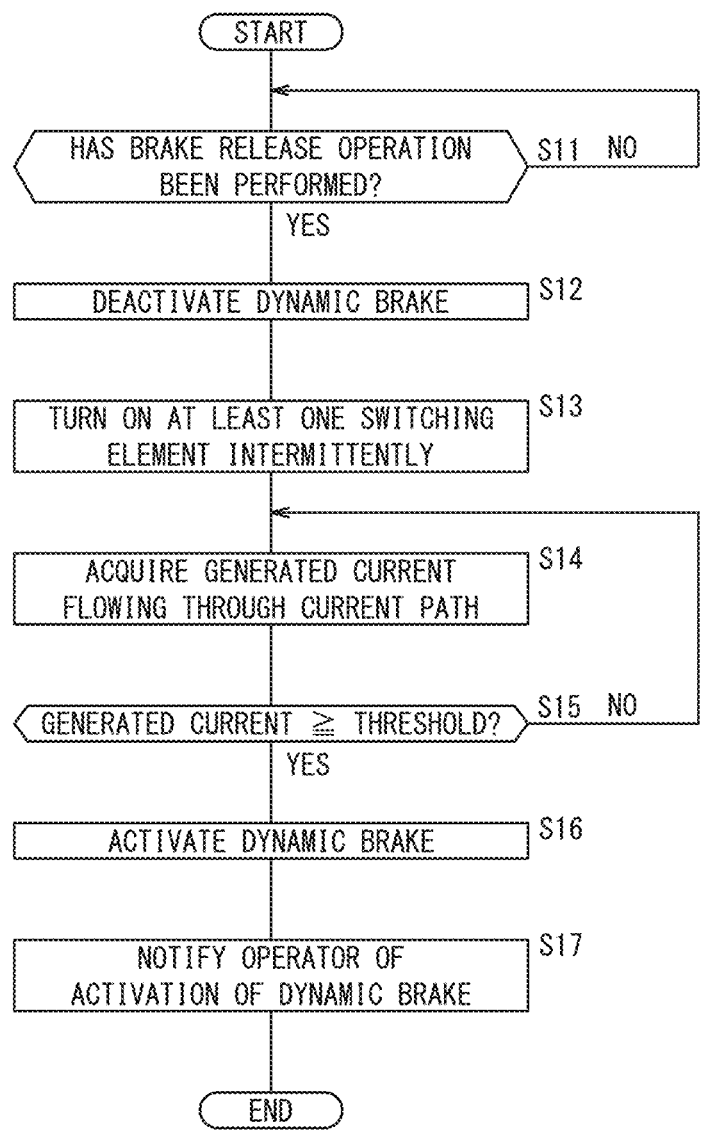
FIG. 4 is a flowchart showing the operation of the motor control device shown in FIG. 3.

Next, the operation of the motor control device 10A will be described with reference to the flowchart shown in FIG. 4. FIG. 4 illustrates an operation on the premise that the motor control unit 30 does not drive the servomotor 11 and the brake control unit 34 is operating the dynamic brake 18.

At step S11, the brake control unit 34 determines whether or not the brake release operation has been performed by the operator. This determination is made based on the operation signal sent from the operation unit 20.

If it is determined at step S11 that the brake release operation has not been performed, the control waits in step S11 until it is determined that the brake release operation has been performed, and if it is determined that the brake release operation has been performed, the operation proceeds to step S12.

At step S12, the brake control unit 34 turns off the switches 26$u$, 26$v$ and 26$w$ to thereby deactivate the dynamic brake 18. As a result, braking of the servomotor 11 is released.

Next, at step S13, the motor control unit 30 intermittently turns on at least one of the switching elements S of the inverter 16 in order to form a current path.

Next, at step S14, the state acquisition unit 32A acquires the generated currents flowing through the current path, detected by the current detectors ID1$u$, ID1$y$, ID1$w$.

Next, at step S15, the brake control unit 34 determines whether or not the generated current detected at step S14 is equal to or greater than the threshold TH1. That is, at step S15, it is determined whether or not the rotation amount per unit time of the servomotor 11 is equal to or greater than the predetermined amount.

If it is determined at step S15 that the generated current detected at step S14 is less than the threshold TH1, the control returns to step S14. If it is determined that the generated current detected at step S14 is equal to or greater than the threshold TH1, the control proceeds to step S16.

At step S16, the brake control unit 34 turns on the switches 26u, 26v and 26w to thereby activate the dynamic brake 18.

Next, at step S17, the notifier 24 informs the operator that the dynamic brake 18 has been activated.

As a result, even when the movement target is manually moved with the dynamic brake 18 released, it is possible to prevent the movement target from colliding with the surroundings. For example, even if applying of the braking force to the servomotor 11 is released at the time of teaching, it is possible to prevent the articulated arm from colliding against the surroundings.

[Modifications]

The above-described embodiments can also be modified as follows.

<Modification 1>

There occurs a case where due to a failure of the dynamic brake 18, the switches 26u, 26v and 26w remain ON even if the brake control unit 34 controls the switches 26u, 26v and 26w so as to be turned off (i.e., even if it outputs a control signal for turning off the switches 26u, 26v and 26w to the dynamic brake 18). In this case, the braking force remains applied to the servomotor 11.

For example, when the dynamic brake 18 fails, even if the operator releases the brake by operating the operation unit 20 in order to move the movement target manually, a braking force remains applied to the servomotor 11. Therefore, it is difficult to move the movement target with a weak external force. In this case, the operator assumes that the dynamic brake 18 should be deactivated and tries to move the movement target. However, the movement target does not move with a weak external force, and then the operator feels that there is something strange.

In addition, since the braking force remains applied to the servomotor 11 when the dynamic brake 18 malfunctions, even when the motor control unit 30 drives the servomotor 11, the braking force continues to be applied to the servomotor 11. Therefore, the motor control unit 30 tries to drive the servomotor 11 with a greater electric power, and as a result, electric power is used wastefully, but the operator cannot recognize the fact.

Alternatively, in a case where the switches 26u, 26v and 26w are unable to be turned off for some reason even though the dynamic brake 18 does not fail, the braking by the dynamic brake 18 cannot be released as above. In this way, there are some cases in which the braking by the dynamic brake 18 cannot be properly released for some reason.

Figure 5:
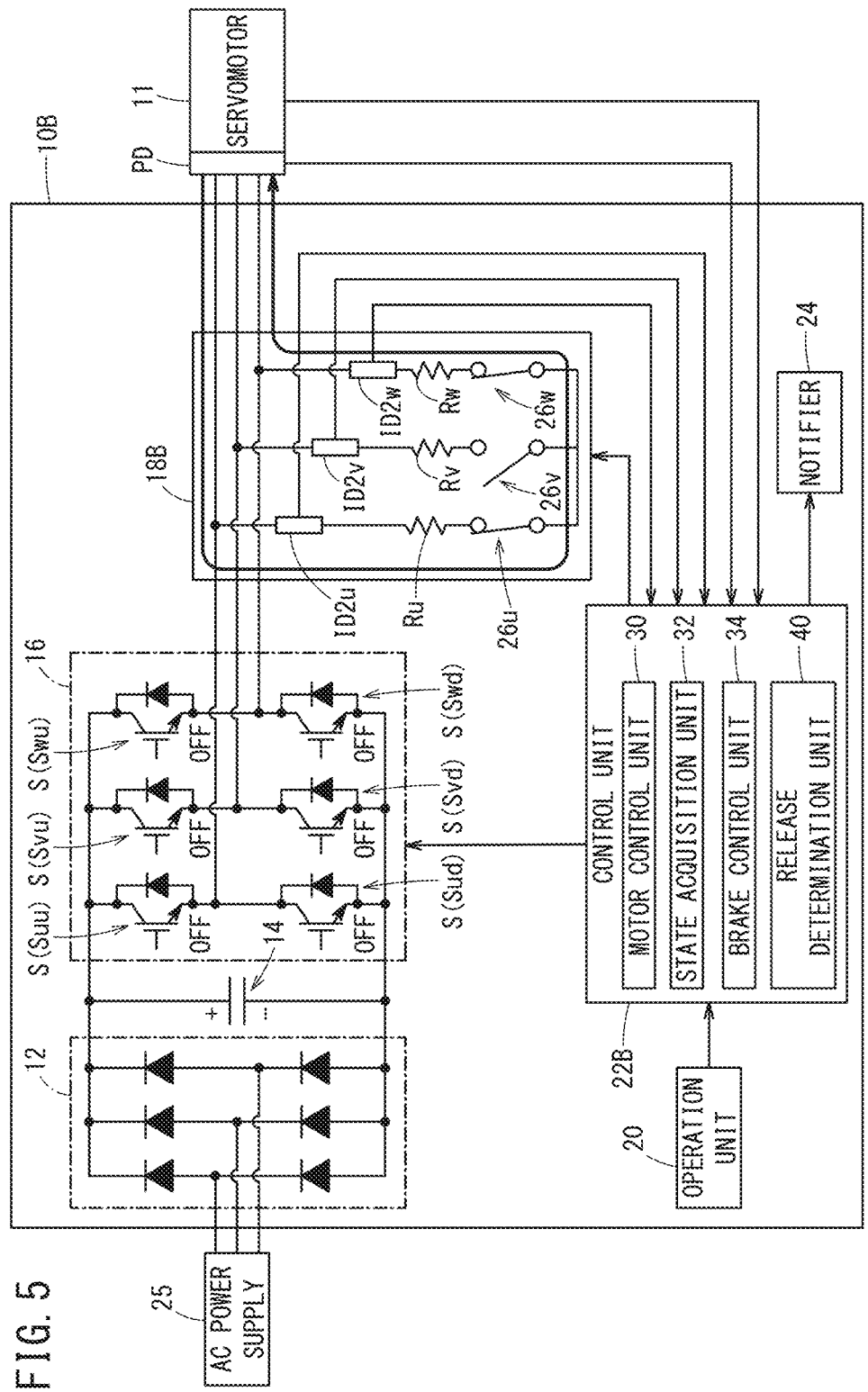
FIG. 5 is a diagram showing an example of a configuration of a motor control device according to Modification 1.

To deal with such a case, Modification 1 is configured to detect whether the braking by the dynamic brake 18 has been released. FIG. 5 is a diagram showing an example of a configuration of a motor control device 10B according to Modification 1. The motor control device 10B shown in FIG. 5 has the same configuration as the motor control device 10 shown in FIG. 1, except that an arrangement for detecting whether the braking by the dynamic brake 18 has been released is added. The same components as those of the first embodiment are denoted by the same reference numerals, and only different portions will be described.

The motor control device 10B includes a rectifier 12, a smoothing capacitor 14, an inverter 16, a dynamic brake (brake) 18B, an operation unit 20, a control unit 22B, and a notifier 24.

The dynamic brake 18B further includes current detectors ID2u, ID2v and ID2w in the dynamic brake 18 shown in FIG. 1. The current detectors ID2u, ID2v and ID2w are sensors that detect currents flowing through the resistors Ru, Rv and Rw.

The control unit 22B further includes a release determination unit 40, added to the control unit 22 shown in FIG. 1. When the brake control unit 34 does not operate the dynamic brake 18B, the release determination unit 40 determines whether or not the braking by the dynamic brake 18B has been released, based on the currents detected by the current detectors ID2u, ID2v and ID2w.

Specifically, when the brake control unit 34 is not operating the dynamic brake 18B, if the currents detected by the current detectors ID2u, ID2v and ID2w become equal to or higher than a threshold (second threshold) TH2, then the release determination unit 40 determines that the braking by the dynamic brake 18B is not released. When determining that the braking by the dynamic brake 18B is not released, the release determination unit 40 outputs an abnormality signal to the notifier 24.

When the dynamic brake 18B is not activated, since the switches 26u, 26v and 26w are normally off, no current will flow through the resistors Ru, Rv and Rw. Therefore, if electric current equal to or greater than the threshold TH2 flows through the resistors Ru, Rv and/or Rw when the dynamic brake 18B is not activated, then the switches 26u, 26v and/or 26w can be considered to remain ON for some reason.

When the abnormality signal is sent from the release determination unit 40, the notifier 24 informs the operator that application of the braking force by the dynamic brake 18B is not canceled.

As described above, in Modification 1, it is possible to determine whether or not applying of the braking force by the dynamic brake 18B has been canceled, based on the currents flowing through the resistors Ru, Rv and Rw. Further, when the application of the braking force by the dynamic brake 18B is not canceled, it is possible to inform the operator to that effect. Therefore, the operator can quickly check the dynamic brake 18B and the like.

Modification 1 has been described by taking an example of a configuration in which an arrangement for detecting whether the braking by the dynamic brake 18 has been released is added to the motor control device 10 shown in FIG. 1. However, the arrangement for detecting whether the braking by the dynamic brake 18 has been released may be added to the motor control device 10A shown in FIG. 3.

<Modification 2>

In each of the above embodiments and Modification 1, the dynamic brake constituted by an electric circuit is used as the brake 18. However, the brake 18 may be a mechanical brake such as a disk brake, a drum brake, etc., which applies braking force to the servomotor 11 by mechanical operation.

<Modification 3>

In each of the above embodiments and modifications 1 and 2, only one brake is provided as a brake for applying braking force to the servomotor 11, but two brakes may be provided. For example, a dynamic brake and a mechanical brake may be provided in combination. In this case, when applying braking force to the servomotor 11, both the brakes operate.

[Technical Ideas Obtained from Embodiment]

Technical ideas that can be grasped from each of the embodiments and Modifications 1 to 3 are described below.

<First Technical Idea>

The motor control device (10, 10A, 10B) for controlling a servomotor (11) includes: an inverter (16) having a plurality of switching elements (S) and configured to convert a DC voltage into an AC voltage and supply the AC voltage to the servomotor (11); a motor control unit (30) configured to control switching operation of the plurality of switching elements (S) to thereby drive the servomotor (11); a brake (18, 18B) configured to apply a braking force to the servomotor (11); a brake control unit (34) configured to control the brake (18, 18B); and a state acquisition unit (32, 32A) configured to acquire a rotational state of the servomotor (11). The brake control unit (34) is configured to actuate the brake (18, 18B) when the rotation amount per unit time of the servomotor (11) reaches a predetermined amount or greater in a state where the servomotor (11) is not driven by the motor control unit (30) and the brake (18, 18B) is not operated.

With the above configuration, when the brake (18) is released and the movement target is manually moved, it is possible to prevent the movement target from colliding with the surroundings. For example, when applying of the braking force to the servomotor (11) is canceled at the time of teaching, it is possible to prevent the articulated arm from colliding against the surroundings.

In the motor control device (10), the state acquisition unit (32) may be configured to acquire the rotational position of the servomotor (11) as the rotational state of the servomotor (11). In this case, the brake control unit (34) may be configured to actuate the brake (18, 18B) when the amount of change in the rotational position per unit time reaches a predetermined amount or greater in a state where the servomotor (11) is not driven by the motor control unit (30) and the brake (18, 18B) is not operated. Thereby, when the brake (18) is released and the movement target is moved by hand, it is possible to prevent the movement target from colliding with the surroundings.

In the motor control device (10A), the motor control unit (30) may be configured to intermittently turn on at least one of the plurality of switching elements (S) without driving the servomotor (11) in a state where the brake (18, 18B) is not operated, so as to form a circuit configured to return an electric current generated by the servomotor (11) to the servomotor (11) via the inverter (16). In this case, the state acquisition unit (32A) may be configured to acquire the generated electric current as the rotational state of the servomotor (11). Further, the brake control unit (34) may be configured to actuate the brake (18, 18B) when the generated electric current reaches a first threshold (TH1) or greater in a state where the servomotor (11) is not driven by the motor control unit (30) and the brake (18, 18B) is not operated. Thereby, when the brake (18) is released and the movement target is moved by hand, it is possible to prevent the movement target from colliding with the surroundings.

In the motor control device (10B), the brake (18B) may be a dynamic brake. In this case, the motor control device (10B) may further include a release determination unit (40) configured to determine that braking by the dynamic brake (18B) is not released if an electric current flowing through the dynamic brake (18B) reaches a second threshold (TH2) or greater in a state where the dynamic brake (18B) is not actuated by the brake control unit (34). Thereby, it is possible to detect that applying of the braking force by the dynamic brake (18B) is not canceled (i.e., to detect that braking by the dynamic brake is not released).

<Second Technical Idea>

A motor control method is a method by which a motor control device (10, 10A, 10B) controls a servomotor (11). The motor control device (10, 10A, 10B) includes: an inverter (16) having a plurality of switching elements (S) and configured to convert a DC voltage into an AC voltage and supply the AC voltage to the servomotor (11); and a brake (18, 18B) configured to apply a braking force to the servomotor (11). The motor control method includes: a motor control step of controlling switching operation of the plurality of switching elements (S) to thereby drive the servomotor (11); a brake control step of controlling the brake (18, 18B); and a state acquiring step of acquiring the rotational state of the servomotor (11). The brake control step actuates the brake (18, 18B) when the rotation amount per unit time of the servomotor (11) reaches a predetermined amount or greater in a state where the servomotor (11) is not driven by the motor control step and the brake (18, 18B) is not operated.

With the above configuration, when the brake (18) is released and the movement target is moved by hand, it is possible to prevent the movement target from colliding with the surroundings. For example, when applying of the braking force to the servomotor (11) is canceled at the time of teaching, it is possible to prevent the articulated arm from colliding against the surroundings.

In the motor control method for the motor control device (10) to control the servomotor (11), the state acquiring step may acquire the rotational position of the servomotor (11) as the rotational state of the servomotor (11). In this case, the brake control step may actuate the brake (18, 18B) when the amount of change in the rotational position per unit time reaches a predetermined amount or greater in a state where the servomotor (11) is not driven by the motor control step and the brake (18, 18B) is not operated. Thereby, when the brake (18) is released and the movement target is moved by hand, it is possible to prevent the movement target from colliding with the surroundings. In the motor control method for the motor control device (10A) to control the servomotor (11), the motor control step may intermittently turn on at least one of the plurality of switching elements (S) without driving the servomotor (11) in a state where the brake (18, 18B) is not operated, so as to form a circuit configured to return an electric current generated by the servomotor (11) to the servomotor (11) via the inverter (16). In this case, the state acquiring step may acquire the generated electric current as the rotational state of the servomotor (11). Further, the brake control step may actuate the brake (18, 18B) when the generated electric current reaches a first threshold (TH1) or greater in a state where the servomotor (11) is not driven by the motor control step and the brake (18, 18B) is not operated. Thereby, when the brake (18) is released and the movement target is moved by hand, it is possible to prevent the movement target from colliding with the surroundings.

In the motor control method for the motor control device (10B) to control the servomotor (11), the brake (18B) may be a dynamic brake. In this case, the motor control method may further include a release determination step of determining that braking by the dynamic brake (18B) is not released if an electric current flowing through the dynamic brake (18B) reaches a second threshold (TH2) or greater in a state where the dynamic brake (18B) is not actuated by the brake control step. Thereby, it is possible to detect that applying of the braking force by the dynamic brake (18B) is not canceled (i.e., to detect that braking by the dynamic brake is not released).

While the invention has been particularly shown and described with reference to the preferred embodiments, it will be understood that variations and modifications can be effected thereto by those skilled in the art without departing from the scope of the invention as defined by the appended claims.

What is claimed is:

1. A motor control device for controlling a servomotor, comprising:
   an inverter having a plurality of switching elements and configured to convert a DC voltage into an AC voltage and supply the AC voltage to the servomotor;
   a motor control unit configured to control switching operation of the plurality of switching elements to thereby drive the servomotor;
   a brake configured to apply a braking force to the servomotor;
   a brake control unit configured to control the brake; and
   a state acquisition unit configured to acquire a rotational state of the servomotor,
   wherein the brake control unit is configured to actuate the brake when a rotation amount per unit time of the servomotor reaches a predetermined amount or greater in a state where the servomotor is not driven by the motor control unit and the brake is not operated, wherein:
   the brake is a dynamic brake; and
   the motor control device further comprises a release determination unit configured to determine that braking by the dynamic brake is not released if an electric current flowing through the dynamic brake reaches a second threshold or greater in a state where the dynamic brake is not actuated by the brake control unit.

2. The motor control device according to claim 1, wherein:
   the state acquisition unit is configured to acquire a rotational position of the servomotor as the rotational state of the servomotor; and
   the brake control unit is configured to actuate the brake when an amount of change in the rotational position per unit time reaches a predetermined amount or greater in a state where the servomotor is not driven by the motor control unit and the brake is not operated.

3. The motor control device according to claim 1, wherein:
   the motor control unit is configured to intermittently turn on at least one of the plurality of switching elements without driving the servomotor in a state where the brake is not operated, so as to form a circuit configured to return an electric current generated by the servomotor to the servomotor via the inverter;
   the state acquisition unit is configured to acquire the generated electric current as the rotational state of the servomotor; and
   the brake control unit is configured to actuate the brake when the generated electric current reaches a first threshold or greater in a state where the servomotor is not driven by the motor control unit and the brake is not operated.

4. A motor control method of a motor control device for controlling a servomotor, wherein the motor control device includes: an inverter having a plurality of switching elements and configured to convert a DC voltage into an AC voltage and supply the AC voltage to the servomotor; and a brake configured to apply a braking force to the servomotor, the motor control method comprising:
   a motor control step of controlling switching operation of the plurality of switching elements to thereby drive the servomotor;
   a brake control step of controlling the brake; and
   a state acquiring step of acquiring a rotational state of the servomotor,
   wherein in the brake control step, the brake is actuated when a rotation amount per unit time of the servomotor reaches a predetermined amount or greater in a state where the servomotor is not driven by the motor control step and the brake is not operated, wherein the brake is a dynamic brake, and
   the motor control method further comprises a release determination step of determining that braking by the dynamic brake is not released if an electric current flowing through the dynamic brake reaches a second threshold or greater in a state where the dynamic brake is not actuated by the brake control step.

5. The motor control method according to claim 4, wherein:
   the state acquiring step acquires a rotational position of the servomotor as the rotational state of the servomotor; and
   the brake control step actuates the brake when an amount of change in the rotational position per unit time reaches a predetermined amount or greater in a state where the servomotor is not driven by the motor control step and the brake is not operated.

6. The motor control method according to claim 4, wherein:
   the motor control step intermittently turns on at least one of the plurality of switching elements without driving the servomotor in a state where the brake is not operated, so as to form a circuit configured to return an electric current generated by the servomotor to the servomotor via the inverter;
   the state acquiring step acquires the generated electric current as the rotational state of the servomotor; and
   the brake control step actuates the brake when the generated electric current reaches a first threshold or greater in a state where the servomotor is not driven by the motor control step and the brake is not operated.

* * * * *